United States Patent

Chiba

[11] 4,206,393
[45] Jun. 3, 1980

[54] NUMERICAL CONTROL SYSTEMS FOR MACHINE TOOLS

[75] Inventor: Jiro Chiba, Yokohama, Japan

[73] Assignee: Nippon Gakki Seizo Kabushiki Kaisha, Hamamatsu, Japan

[21] Appl. No.: 885,564

[22] Filed: Mar. 13, 1978

[30] Foreign Application Priority Data

Mar. 18, 1977 [JP] Japan .................................. 52/29988
Jun. 28, 1977 [JP] Japan .................................. 52/76911
Jun. 28, 1977 [JP] Japan .................................. 52/76912

[51] Int. Cl.² ........................................ G05D 23/275
[52] U.S. Cl. ...................................... 318/632; 318/561; 29/6
[58] Field of Search ............... 318/561, 632, 636, 575; 29/6; 82/9, 10; 51/165 TP, 165.71

[56] References Cited

U.S. PATENT DOCUMENTS

| | | | |
|---|---|---|---|
| 3,555,252 | 1/1971 | Garden | 318/561 |
| 3,555,254 | 1/1971 | Gerber | 318/632 |
| 3,644,719 | 2/1972 | Rouxel et al. | 318/561 |
| 3,917,930 | 11/1975 | Davey et al. | 318/561 |

Primary Examiner—Gene Z. Rubinson
Assistant Examiner—Eugene S. Indyk
Attorney, Agent, or Firm—Spensley, Horn, Jubas & Lubitz

[57] ABSTRACT

In a numerical control system of a machine tool wherein a servo-system for driving tool, table etc. is controlled by a control instruction signal expressed by a given function equation, there are provided a control instruction signal generator which generates a signal representing a control instruction value, a correction device for producing a correction signal corresponding to a phase lag angle of a servo-drive system for driving a working shaft and a correction device for correcting the control instruction value in accordance with the correction signal.

9 Claims, 8 Drawing Figures $\omega = \dfrac{d\theta}{dt}$

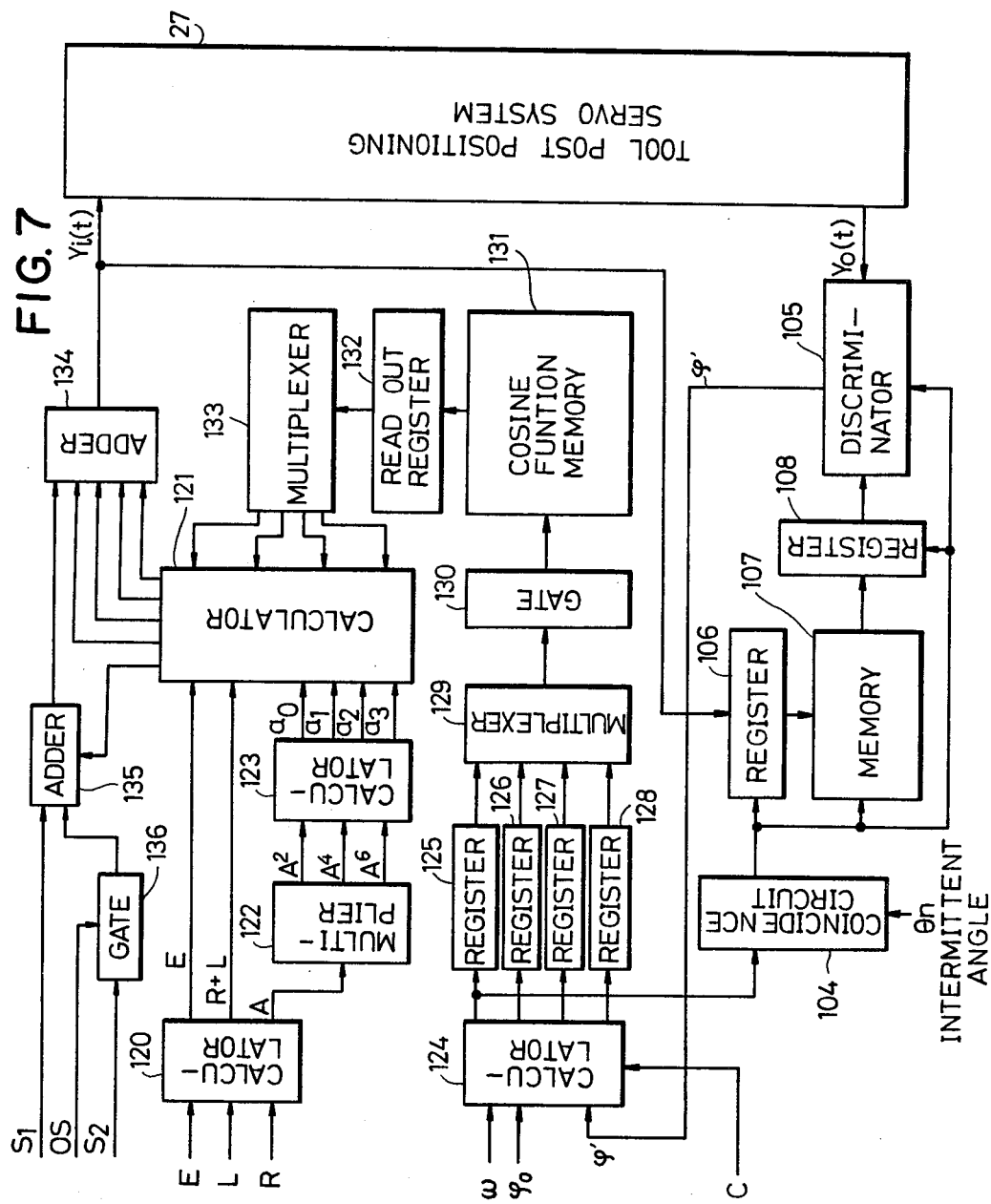

NUMERICAL CONTROL SYSTEMS FOR MACHINE TOOLS

BACKGROUND OF THE INVENTION

This invention relates to a numerical control system of a machine tool and, more particularly, to a control instruction value generating system for generating a control instruction value expressed by a complicated function equation.

When numerically controlling a tool of a machine tool by simultaneously controlling the position of the tool on the X and Y axes of rectangular coordinates so as to move the tool along a predetermined locus on a table, the control instruction value given to the tool or table comprises a complicated function.

For example, when cutting or grinding a pin journal of the crankshaft of an internal combustion engine to give it an outer contour of a true circle, since the pin journal is located eccentrically with respect to the main journal of the engine crankshaft, it is necessary to use an instruction value expressed by a complicated function equation.

In the numerical control system of a machine tool, there is a problem of occurrence of a working error caused by time lag of the driving system (including the load) with respect to the instruction from the control device. For example, when both X and Y axes positions are simultaneously controlled so as to move the tool along a curve on a plane, the phase lag caused by the inherent load characteristics of the servo-system of the machine tool, that is the resultant of the movements along X and Y axes, has an influence upon the machining accuracy. Moreover, the effect caused by the characteristics differs depending upon the rectangular coordinates (xi, yi) of a working point. For this reason, according to the prior art system it is difficult to work at high accuracies and it is necessary to use post machining. For example, for the purpose of cutting or grinding of pin journal located eccentrically with respect to the main journal of the crankshaft of an internal combustion engine to give it a true circular cross-section, when the axis of the pin journal is revolved about the axis of the main journal by holding it by a chuck and when a control system is used to cause a tool which rotates in contact with the periphery of the pin journal to linearly reciprocate to follow said revolving motion, the time lag of a servo-system which causes linear motion of the tool head and the movement of the contact point (working point) between the workpiece and the tool are related in a complicated manner thus causing a working error.

SUMMARY OF THE INVENTION

It is an object of this invention to provide an improved numerical control system of a machine tool capable of producing an accurate control instruction from complicated function equation.

According to this invention, the control instruction function equation is decomposed into Fourier components, and these components are independently calculated and then added together to generate a control instruction.

Another object of this invention is to provide an improved numerical control system capable of machining with a minimum loss wherein the driving instruction signal of a servo-system is precorrected by an error anticipated by the inherent characteristic of the servo-system so as to drive the servo-system by the corrected instruction signal.

Still further object of this invention is to provide an accurate and efficient numerical control system of a machine tool wherein the control instruction signal and a feedback signal are intermittently compared with each other to intermittently calculate the control instruction.

According to this invention these and further objects can be accomplished by providing a numerical control system of a machine tool wherein a servo-system for driving a tool, table, etc. of the machine tool is controlled by a control instruction signal expressed by a predetermined function equation, characterized by comprising a control instruction signal generator which generates a signal representing a control instruction value, a correction device for generating a correction value corresponding to a phase lag angle of a servo-drive system for driving a working shaft of the machine tool and correction means for correcting the control instruction value in accordance with the correction signal.

BRIEF DESCRIPTION OF THE DRAWINGS

In the accompanying drawings:

FIG. 7 is a block diagram showing one example of a control instruction value generating circuit.

DESCRIPTION OF THE PREFERRED EMBODIMENT

Figure 1:
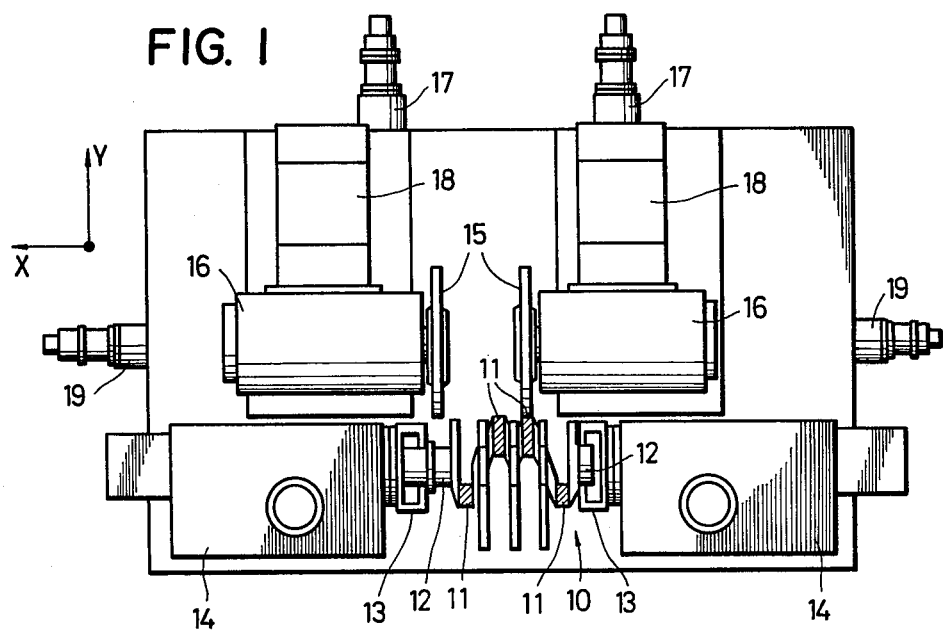
FIG. 1 is a plan view showing one example of a machine tool to which the invention is applicable.

Referring now to the accompanying drawings,

FIG. 1 is a plan view of a machine tool for grinding the pin journals 11 (shaded portions) of a crankshaft 10 of an internal compustion engine. The main journal 12 of the crankshaft 10 is held by chucks 13 and rotated by a work rotation control unit 14. Grinding wheels 15 are mounted on driving units 16 and driven by electric motors, not shown, in the driving units. These driving units are reciprocated by servo-motors 17 in the direction of Y axis and moved in the direction of X axis by shift motors 19 to vary the tool pitch.

Figure 2:
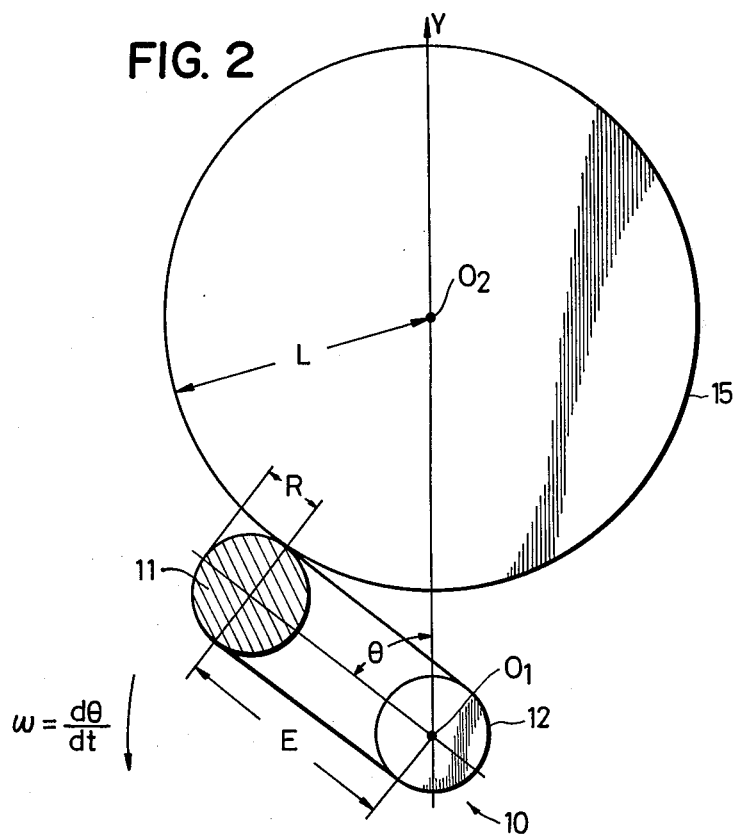
FIG. 2 is a diagram showing the relationship between a grinding wheel and a pin journal to be machined.

FIG. 2 shows the positional relationship between one grinding wheel 15 and one pin journal 11 to be ground which is rotated about point $O_1$ at a constant angular velocity $\omega$. As a consequence, the pin journal 11 is revolved about the center $O_1$ with its same surface always being directed outwardly. The grinding wheel 15 is rotated about point $O_2$ and it is necessary to control the grinding wheel such that it is always maintained in contact with the outer periphery of the pin journal 11. To this end, it is necessary to displace the center $O_2$ of the grinding wheel 15 in accordance with the angular position (rotary angle $\theta$) of the workpiece 11. The displacement in the direction of Y axis is expressed as a function Y(t) of time (t) as shown by the following equation.

$$Y(t) = E \cos \omega t + \sqrt{(R+L)^2 - E^2 \sin^2 \omega t} \qquad (1)$$

where $\omega$ represents the angular velocity of pin journal 11, that is $\omega = d\theta/dt$, L the radius of the grinding wheel, R the radius of the pin journal, and E the distance between the center of the pin journal 11 and its center of rotation $O_1$.

When the grinding wheel 15 moves just in accordance with the function Y(t) expressed by equation (1), the pin journal 11 would be exactly ground into a circle having radius R. The working path traced by the contact point between the grinding wheel and the pin journal, that is the working point is an annulus. Although the servo-motors 17 are driven by using the function value Y(t) corresponding to the variation in the rotary angle $\theta$ as an instruction value, due to the time delay in the response of the servo-system, a position error $\epsilon$ would result. More particularly, the servo-system is driven in a direction to make zero the difference between the present Y axis position $Y_o(t)$ of the tool driving unit 16 detected by a position detector and the instruction value Y(t) but there is a time delay before the difference is decreased to zero. The position error $\epsilon$ caused by the time delay increases with the angular speed $\omega$ but is solely determined to correspond to the rotary angle $\theta$ so long as the angular velocity is constant.

Figures 3, 4A, 4B:
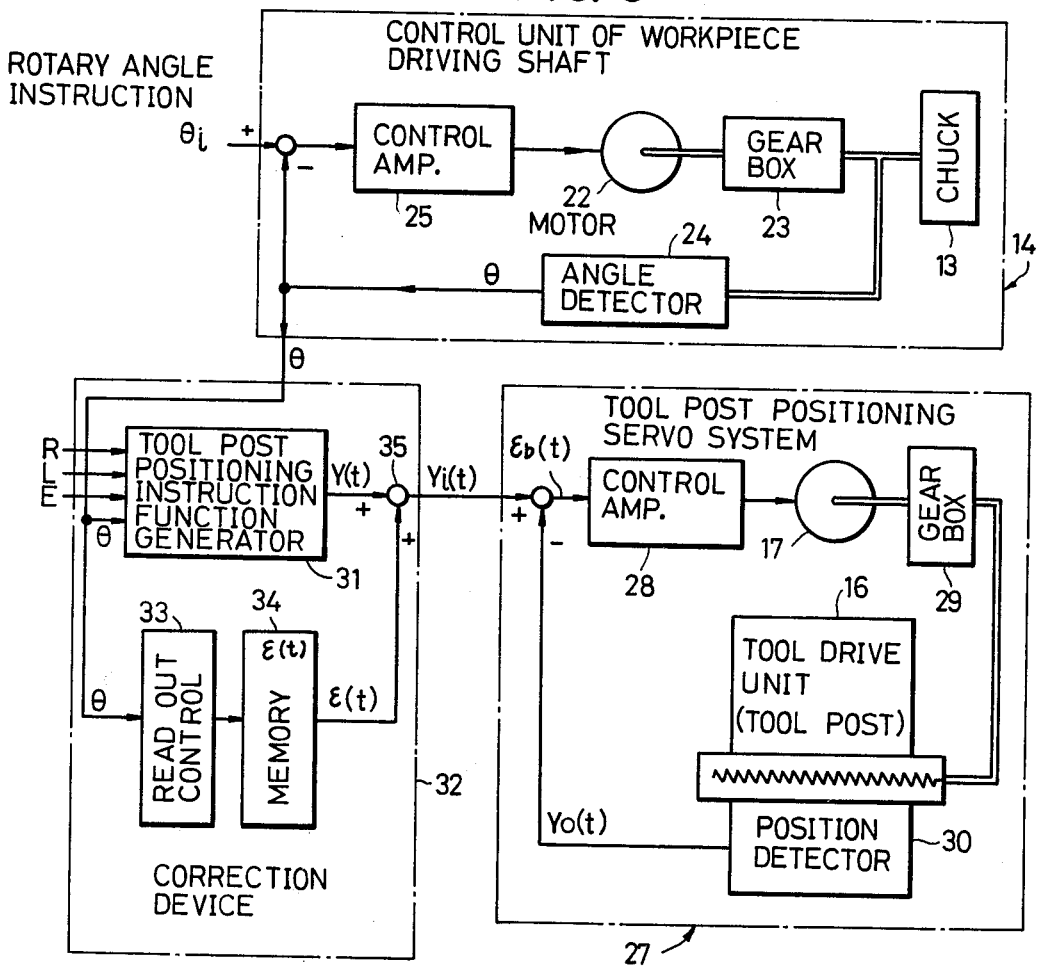
FIG. 3 is a block diagram showing one example of the control system embodying the invention.
FIGS. 4a and 4b show transfer functions utilized in the control system shown in FIG. 3.

FIG. 3 shows one example of the control device of this invention provided with a correction device that can substantially correct the time delay. According to this correction device, the position error $\epsilon(t)$ is predetermined in accordance with the rotary angle $\theta$, the instruction value Y(t) is corrected by the position error $\epsilon(t)$ and the resulting corrected value $Y(t) + \epsilon(t)$ is used as a new instruction value for driving the servo system.

The correction device comprises a control unit for the workpiece driving shaft 14 in which the rotation of an electric motor 22 is transmitted to a chuck 13 via a gear box 23 to rotate the workpiece 10. An angle detector 24 is provided to detect the rotary angle $\theta$ of the workpiece by detecting the rotary angle of the chuck 13. A deviation signal between a rotary angle instruction value $\theta_i$ from an external control and the present rotary angle $\theta$ is applied to motor 22 through a control amplifier 25. The detected rotary angle $\theta$ is applied to a tool post positioning instruction function generator 31 and a correction device 32 so as to produce a corrected positioning instruction function Yi(t) which is supplied to a tool post positioning servo-system 27 for driving the tool drive unit (tool post) 16 in the direction of Y through control amplifier 28, a servo-motor 17, and a gear box 29. A position detector 30 is provided to detect the present Y axis position Yo(t) of the tool drive unit 16 and the detected Y axis position Yo(t) is fed back to the input of the control amplifier 28.

The delay in the tool post positioning servo-system 27 presents the problem described above and the characteristic of this system is expressed by a transfer function $K_L/S(1+TS)$ shown in a block shown in FIG. 4a, where Yi(s) represents the input instruction value, $\epsilon$(s) the deviation, Yo(s) the output, $K_L$ the total gain of the servo-system, and T the time constant thereof. The transfer function is shown after laplace transformation. The total transfer function of the closed loop shown in FIG. 4a can be shown by $$1/(1 + 2\zeta T_o S + T_o^2 S^2)$$

as shown in FIG. 4b, where $\zeta$ and To are constants determined by the loop gain, and the moment of inertia of the load and the motor, and can be determined by $K_L$ and T.

The tool post positioning instruction function generator 31 and the correction device 32 produce a corrected instruction value Yi(t) by adding the error $\epsilon(t)$ to the instruction value Y(t) for the purpose of eliminating the error caused by the response delay of the servo-system described above. The tool post positioning instruction function generator 31 produces the function Y(t) expressed by equation (1) in response to a signal representing the rotary angle and the correction device 32 produces a signal representing the expected position error quantity $\epsilon(t)$ in accordance with the value of the rotary angle $\theta$. Assume now that $\omega$, R, E, L are constants as above described, the correction function (position error quantity) $\epsilon(t)$ becomes a function of the rotary angle $\theta$ so that the values of the function $\epsilon(t)$ corresponding to different values of $\theta$ are stored in a memory device 34 in the form of programmable read only memory device, random access memory device or a core memory device and a correction signal $\epsilon(t)$ corresponding to the value of the rotary angle $\theta$ is read out by designating a read address of the memory device 34 corresponding to the value of $\theta$ applied to a read out control unit 33. The read out correction signal $\epsilon(t)$ is added to the positioning instruction function Y(t) by an addition unit 35 to obtain corrected instruction function Yi(t). Thus, the instruction function Yi(t) corresponds to the sum of the function Y(t) shown by equation (1) and the anticipated error quantity $\epsilon(t)$. In response to the deviation $E_b(t)$ between the corrected instruction function Yi(t) and the fed back function Yo(t), the servo-system 27 drives the servo-motor 17. As a consequence, the servo-system 27 responds to the corrected instruction function Yi(t) with a time delay but its response delay for the true positioning instruction function Y(t) is much smaller and, accordingly, with a smaller error.

Figure 5:
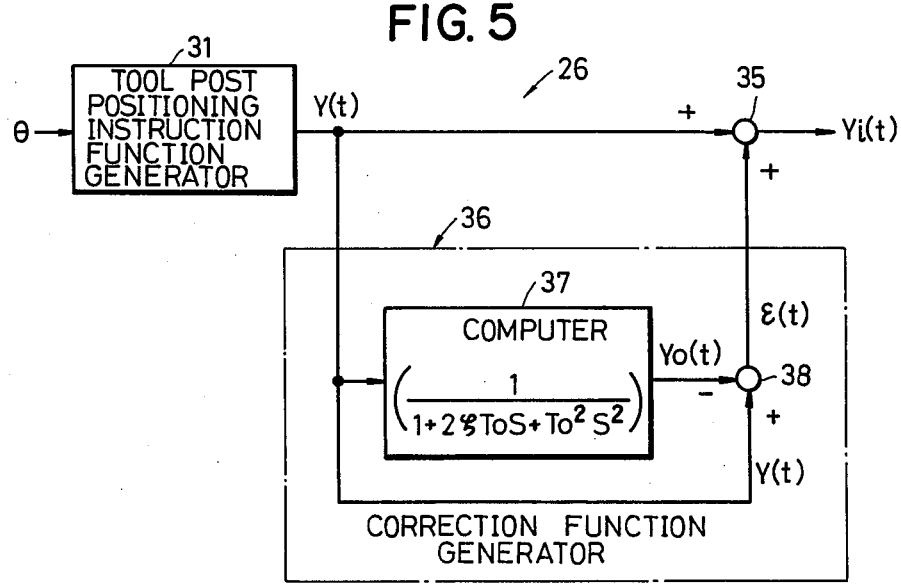
FIG. 5 is a block diagram showing another example of the tool post positioning instruction function generator and of the correction function generator.

FIG. 5 shows a modification of the tool post positioning instruction function and the correction function generator 26 in which a computer 37 is incorporated into the correction function generator 36 to receive the positioning instruction function Y(t) generated by the tool post positioning instruction function generator 31. The computer 37 processes in real time the input Y(t) by using a transfer function $$1/1 + 2\zeta T_o S + T_o^2 S^2$$

which is equivalent to that of the servo-system 27 to produce an output Yo(t) which is equivalent to a not corrected output of the servo-system 27. Thus, the characteristic of the servo-system is simulated in real time by the computer 37. The deviation between this output Yo(t) and the input Y(t) is obtained by a subtractor 38 to produce an anticipated error correction function $\epsilon(t)$. The function $\epsilon(t)$ thus obtained is added to the positioning instruction function Y(t) by an adder 35 in the same manner as above described. Thus, a corrected instruction function Yi(t) is obtained and applied to the servo-system 27.

Figure 6:
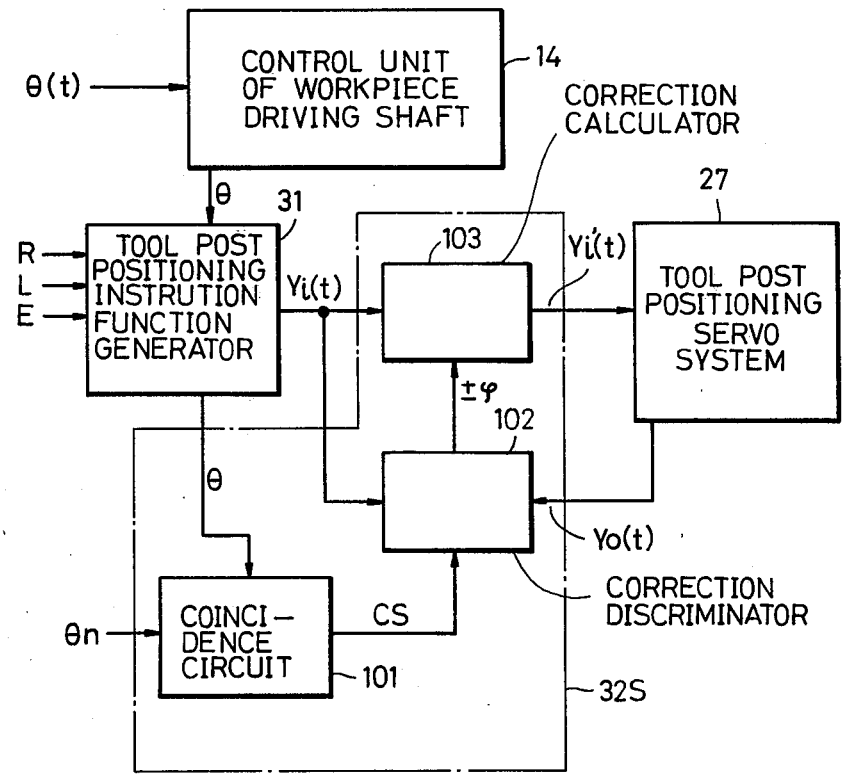
FIG. 6 is a block diagram showing a modified correction device.

In the correction device described above, the position error is determined beforehand and sent out in accordance with the rotary angle $\theta$ for correcting the instruction value but in the modified embodiment shown in FIG. 6, the instruction value Yi(t) and the feedback value Yo(t) from the servo-system are compared with each other intermittently for calculating a phase delay $\pm\psi$ which is used to correct the instruction value expressed by equation (1) thereby obtaining the correction value expressed by the following equation 2.

$$Yi(t) = E\cos(\omega t \pm \psi) + \sqrt{(R+L)^2 - E^2 \sin(\omega \pm \psi)} \quad (2)$$

In the embodiment shown in FIG. 6, intermittent angle values $\theta n$ are spaced by a predetermined angle, for example 0°, 45°, 90° and 135°. A coincidence circuit 101 is supplied with a value $\theta$ which shows the rotary angle of the chuck 13 from the tool post positioning instruction function generator 31, and each time this value $\theta$ coincides with the intermittent angle value $\theta n$ a coincidence signal CS is generated which is applied to a correction discriminator 102. The correction discriminator detects and discriminates the phase lag $\pm\psi$ of the position feedback value Yo(t) which is supplied from the tool post positioning servo system 27 and showing the present Y axis position of the tool post 17 with respect to the output Yi(t) of the tool post positioning instruction function generator 31 and when supplied with the coincidence signal CS from the coincidence circuit 101, it detects the phase lag $\pm\psi$ depending upon the phase difference between Yi(t) and Yo(t). This phase lag $\pm\psi$ is applied to a correction calculator 103.

The correction calculator 103 corrects the output Y(t) of the tool post positioning function generator 31 with the phase lag $\pm\psi$ detected by the correction discriminator 102. Thus, the correction calculator 103 calculates the value Yi(t) expressed by equation 2 in accordance with the phase lag $\pm\psi$ and applies the value Yi(t) to the tool post positioning servo-system 27 as the instruction value.

As above described, the output of the tool positioning instruction function generator 31 is intermittently corrected each time the rotary angle $\theta$ of the chuck 13 of the workpiece rotary shaft control unit 14 coincides with a predetermined angle $\theta n$, so that the tool positioning servo-system 27 is controlled by the instruction value Y'i(t) which has been corrected with phase delay $\pm\psi$. Accordingly, although the tool positioning servo-system 27 responds to the instruction value Y'i(t) with a time lag, it can respond to the true instruction value Yi(t) produced by the tool positioning instruction function generator 31 with an extremely small response delay.

The instruction function generator 31 may be of any desired type and a control instruction can be prepared very quickly when a function equation is developed into Fourier's series and when respective Fourier components are calcualted and then added together, which is advantageous for the control.

Thus, by developing equation (1) into Fourier's series $$Y(t) = E\cos\omega t + (R+L)(a_0 + a_1 \cos 2\omega t + a_2 \cos 4\omega t + a_3 \cos 6\omega t \ldots + A_n \cos 2n\omega t) \quad (3)$$

where $$a_0 = 1 - (\tfrac{1}{4}A^2 + \tfrac{3}{64}A^4 + \tfrac{10}{512}A^6 + \ldots) \quad (4)$$

$$a_1 = \tfrac{1}{4}A^2 + \tfrac{4}{64}A^4 + \tfrac{15}{512}A^6 + \quad (5)$$

$$a_2 = \tfrac{1}{64}A^4 + \tfrac{6}{512}A^6 + \quad (6)$$

-continued $$a_3 = \tfrac{1}{512}A^6 + \quad (7)$$

Since $L \gg E$, $A^n \to 0$. Since the Fourier's series converges, it is possible to calculate the instruction value Yo(t) of a permissible accuracy by calculating up to a suitable n-th order.

FIG. 7 shows one example of a control instruction value generating circuit for performing the above described calculations which is useful for a machine tool which grinds the pin journals of the crankshaft of an internal combustion engine shown in FIG. 1 and in which up to the 6th order of the Fourier components of the function equation Y(t) expressed by equation (1) are calculated to form the control instruction value Y(t). Value E representing the rotary radius of the pin journal 11, value L representing the radius of tool 15 and value R representing the radius of the pin journal are applied to a calculator 120. The calculator 120 calculates values $R+L$ and $A=(E/R+L)$ from values E, L and R and applies values $R+L$ and E to a calculator 121 and value A to a third calculator 122. Calculator 122 comprises a multiplier which calculates values $A^2$, $A^4$ and $A^6$ which are applied to a third calculator 123 which calculates the coefficients $a_0, a_1 \ldots a_n$ shown in equations 4, 5, 6 and 7 from values $A^2$, $A^4$ and $A^6$ and applies the calculated coefficients to fourth calculator 121.

The value $\omega$ representing the angular speed of the pin journal and a correction value $\psi$ are applied to a fifth calculator 124. The correction value $\psi$ is used to correct the time lag in the tool drive system 27 as will be described later. The calculator 124 is also applied with a clock pulse C which is used to synchronize the workpiece drive shaft control unit (FIG. 1) with the rotation of the pin journal 11. In response to $\omega$, $\psi$ and clock signal C, the calculator 124 calculates the values of $(\omega t+\psi)$, $2(\omega t+\psi)$, $4(\omega t+\psi)$ and $6(\omega t+\psi)$ in synchronism with the rotation of the pin journal and these values are stored temporarily in registers 125 through 128 respectively and then applied to a multiplexer 129 which sequentially selects said values temporarily stored in respective registers and applies them to a cosine function memory device 131 through a gate circuit 130. The cosine function memory device 131 comprises a read only memory device, for example, which is storing a corresponding cosine function value corresponding to an input address. Consequently, cosine functions $\cos(\omega t+\psi)$, $\cos 2(\omega t+\psi)$, $\cos 4(\omega t+\psi)$ and $\cos 6(\omega t+\psi)$ are sequentially read out from the cosine function memory device 131 corresponding to respective inputs $(\omega t+\psi)$, $2(\omega t+\psi)$, $4(\omega t+\psi)$ and $6(\omega t+\psi)$ and these read out values are applied to a multiplexer 133 through a read out register 132. The multiplexer 133 converts these serially read out values into parallel values which are applied to the calculator 121.

Calculator 121 produces signals $(R+L) a_0$, E cos $(\omega t+\psi)$, $(R+L)a_1 \cos 2(\omega t+\psi)$, $(R+L) a_2 \cos 4(\omega+\psi)$, and $(R+L) a_3 \cos 6(\omega t+\psi)$ respectively representing the Fourier components of the Fourier's series shown in equation 3 based on values E, $R+L$ which are supplied from calculator 20, values $a_0, a_1, a_2$ and $a_3$ which are supplied from calculator 23 and values $\cos(\omega t+\psi)$, $\cos 2(\omega+\psi)$, $\cos 4(\omega t+\psi)$ and $\cos 6(\omega+\psi)$ which are supplied from the multiplexer 133. The outputs of the calculator 121 are added together by an adder 134 to produce a value $Yi(t)+E \cos(\omega t+\psi)+(R+L) a_0+(R+L)$ $a_1 \cos 2(\omega+\psi)+(R+L) a_2 \cos 4(\omega+\psi) +(R+L) a_3 \cos 6(\omega+\psi)$. This value is applied to the tool drive system 142 as the control instruction value.

One of the outputs of the calculator 121, for example, the value $(R+L) a_0$ representing the DC term, is applied to adder 134 via an adder 135 for the purpose of effecting a manual correction and an addition instruction. In a state in which the addition instruction is not given, such instruction value that the tool will not come in contact with the workpiece is given and, after obtaining information of actual movements of the tool and workpiece, an additional instruction value is added to the original instruction value for effecting cutting. By this arrangement, a damage to the workpiece which may be caused by effecting cutting during a test driving can be avoided. A manual correction value $S_1$ is applied to adder 135 while a preset addition instruction value $S_2$ is applied to adder 135 through a gate circuit 136 opened by an addition instruction signal OS. Where the manual correction is necessary, the manual correction value $S_1$ is added to the output of the calculator 21 whereas when the addition instruction OS is applied, the gate circuit 136 is opened to add the preset addition value $S_2$ to the output of the calculator 121.

As above described, a control instruction Yi(t) according to a function equation Y(t) expressed by equation (1) is formed and applied to the tool drive system 142.

The embodiment shown in FIG. 7 operates as follows.

Let us assume that a correction value $\psi'=0$ is applied to calculator 124 and that the control instruction value Yi(t) is calculated by the clock signal C. The outer $\omega t$ of the calculator 124 is applied to the coincidence circuit 104. This output $\omega t$ represents the rotary angle $\theta=\omega t$ of the pin journal 11, and the coincidence circuit 104 is supplied with intermittent angle value $\theta n$ (n=1, 2 ... n which may be 0°, 45°, 90°, 135°, 180°, for example). Each time signal $\omega t$ coincides with signal $\theta n$, the coincidence circuit 104 applies a coincidence signal to the register 106. Since the register 106 is supplied with the output Yi(t) of the adder 134, the coincidence signal is given with a write timing. More particularly, the register 106 is written with value Yi(t) each time value $\omega t$ coincides with the present angle $\theta n$. The values written into the register 106 are applied to memory device 107 and sequentially stored therein. In this manner, the value Yi(t) in one period is stored at each preset angle $\theta n$.

When the control instruction value Yi(t) is applied to the tool servo-system 27, it operates and a position feedback signal produced thereby is applied to the discriminator 105. The coincidence circuit 104 produces a coincidence signal each time the value $\omega t$ produced by the calculator 124 coincides with $\theta n$. This coincidence signal is applied to the memory circuit 107 to read out a value Yi(t) corresponding to the value $\theta n$ stored in the memory circuit 107 and the read out value Yi(t) is applied to a discriminator 105 through register 108. The discriminator 105 compares the phases of value Yi(t) and of the feedback value Yo(t) to apply a value $\psi'$ which represents the phase lag to the calculator 124 as a correction value. Thus, the control instruction value Yi(t) is changed to Yi'(t) after correcting the phase angle to $\omega t+\psi'$ thereby correcting the time lag t of the tool drive system 142.

In this embodiment, an approximate correction value $\psi_0$ of the phase lag of the tool drive system is preset in a calculator. Accordingly, the output of the discriminator 105 at this time is $\psi'-\psi_0$ which is a very small value.

What is claimed is:

1. A numerical control system for controlling the position of a machine tool with respect to a workpiece which is moving in a predetermined path, wherein the position of the workpiece is controlled by a control unit in response to a position instruction input, said control unit including a position detector for determining the actual position of the workpiece, comprising:
   a generator for generating a control instruction signal which is a predetermined function of the actual position of the workpiece;
   a servo-system for controlling the position of the machine tool, wherein said control instruction signal is the input to said servo-system; and
   a correction device, for generating a correction signal and for changing the value of the control instruction signal in accordance with the correction signal to compensate for delay errors inherent in said servo-system.

2. The numerical control system according to claim 1 wherein said correction device includes an addder which adds said correction signal to said control instruction signal.

3. The numerical control system according to claim 1 wherein said correction device includes a memory device in which a plurality of correction values are preset, and a read device for reading said memory device by utilizing predetermined positions of the workpiece as the addresses of said memory device.

4. The numerical control system according to claim 1 wherein said correction device includes a calculator, whose input is said control instruction signal, for effecting calculations corresponding to all transfer functions of said servo-system, and means for substracting the output of said calculator from said control instruction signal to obtain the correction signal.

5. The numerical control system according to claim 1 wherein said correction device includes a comparator which compares a feedback signal from the servo-system, said feedback signal corresponding to the position of the machine tool, with said control instruction signal for producing a signal representing the difference between the control instruction signal and the feedback signal, and an intermittent operation device for intermittently operating said comparator device.

6. The numerical control system according to claim 5 wherein the workpiece is driven by a rotating reference shaft and wherein said intermittent operation device comprises means for presetting at least one predetermined angle of the reference shaft, and means for generating a signal which operates said comparator only when the rotary angle of said reference shaft coincides with the present angle.

7. The numerical control system according to claim 1 wherein said generator comprises means for decomposing a function equation into a plurality of Fourier components and for independently calculating said components, and means for adding together said components.

8. The numerical control system according to claim 1 wherein said workpiece is a pin journal of a crankshaft, and said control instruction signal is expressed by the following function equation:

$$Y(t)=E \cos \omega t+\sqrt{(R+L)^2-E^2 \sin^2 \omega t},$$

where ω represents the angular velocity of said pin journal, L the radius of said tool, R the radius of said pin journal, and E the distance between the center of said pin journal and the center of rotation of said crankshaft.

9. A numerical control system for controlling the position of a machine tool with respect to the side of a cylindrical workpiece which is rotating eccentrically, comprising:

a position detector for determining the angular position of the workpiece;

a generator connected to said position detector for generating a control instruction signal which is a predetermined function of the angular position of the workpiece;

a servo-system for controlling the position of the machine tool in response to said control instruction signal; and a correction device, connected to the generator, for generating a correction signal and changing the value of the control instruction signal in order to compensate for time delay errors inherent in said servo-system.

* * * * *

UNITED STATES PATENT AND TRADEMARK OFFICE
CERTIFICATE OF CORRECTION

PATENT NO. : 4,206,393
DATED : June 3, 1980
INVENTOR(S) : Jiro Chiba

It is certified that error appears in the above-identified patent and that said Letters Patent are hereby corrected as shown below:

In the designation of Assignee, change to read as follows: Kabushiki Kaisha Komatsu Seisakusho, Tokyo, Japan.

Signed and Sealed this

Twenty-first Day of October 1980

[SEAL]

*Attest:*

SIDNEY A. DIAMOND

*Attesting Officer*   *Commissioner of Patents and Trademarks*